(12) United States Patent
Nishimoto et al.

(10) Patent No.: US 12,438,818 B2
(45) Date of Patent: Oct. 7, 2025

(54) PERIODIC FLOW DETECTION DEVICE, DELAY ESTIMATION DEVICE, PERIODIC FLOW DETECTION METHOD AND PROGRAM

(71) Applicant: NTT, Inc., Tokyo (JP)

(72) Inventors: Keita Nishimoto, Musashino (JP); Kota Asaka, Musashino (JP); Hiroshi O, Musashino (JP)

(73) Assignee: NTT, Inc., Tokyo (JP)

( * ) Notice: Subject to any disclaimer, the term of this patent is extended or adjusted under 35 U.S.C. 154(b) by 39 days.

(21) Appl. No.: 18/562,641

(22) PCT Filed: May 21, 2021

(86) PCT No.: PCT/JP2021/019406
§ 371 (c)(1),
(2) Date: Nov. 20, 2023

(87) PCT Pub. No.: WO2022/244254
PCT Pub. Date: Nov. 24, 2022

(65) Prior Publication Data
US 2024/0244004 A1    Jul. 18, 2024

(51) Int. Cl.
*H04L 12/24*    (2006.01)
*H04L 41/0803*    (2022.01)
(Continued)

(52) U.S. Cl.
CPC ........ *H04L 47/2441* (2013.01); *H04L 47/283* (2013.01)

(58) Field of Classification Search
CPC ........................... H04L 47/2441; H04L 47/283
(Continued)

(56) References Cited

U.S. PATENT DOCUMENTS

2015/0350046 A1* 12/2015 Thapliya ............. H04L 43/0894
709/224
2016/0112336 A1* 4/2016 Hong ...................... H04L 43/16
370/230
(Continued)

FOREIGN PATENT DOCUMENTS

WO    WO 2015136812    9/2015
WO    WO-2015136812 A1 *  9/2015    ......... H04L 12/6418
(Continued)

OTHER PUBLICATIONS

Abe et al., "System Specific Period Superimposed Chart inPLC System under UDP Transmission—Part 3: Communication Analyses by System Specific Period Superimposed Chart under Test Bed and Actual In-Phase and Out-of-Phase Communications Environments," IEICE Technical Report, Nov. 2018, 42(41):23-26, 9 pages (with machine translation).

(Continued)

*Primary Examiner* — Ario Etienne
*Assistant Examiner* — Elizabeth Kassa
(74) *Attorney, Agent, or Firm* — Fish & Richardson P.C.

(57) ABSTRACT

A periodic flow detection device include a packet classification unit configured to classify packets into a plurality of flows on the basis of information included in acquired packets; a flow evaluation unit configured to evaluate a possibility that each of the plurality of flows is periodically transmitted on the basis of time at which the packets are acquired; and a flow detection unit configured to detect, from the plurality of flows, a periodic flow that is a flow to which packets periodically acquired belongs on the basis of a result of the evaluation.

9 Claims, 14 Drawing Sheets

(51) Int. Cl.
  *H04L 47/2441*  (2022.01)
  *H04L 47/283*  (2022.01)
(58) Field of Classification Search
  USPC .......................................................... 709/238
  See application file for complete search history.

(56) References Cited

U.S. PATENT DOCUMENTS

2017/0373983 A1* 12/2017 Takahashi ............... H04L 43/20
2018/0375780 A1* 12/2018 Sawabe .................. H04L 1/1812
2022/0046228 A1*  2/2022 Haskin ................. H04N 17/002
2022/0128607 A1   4/2022 Nagayama et al.
2022/0167403 A1*  5/2022 Wilhelmsson .... H04W 74/0808

FOREIGN PATENT DOCUMENTS

WO    WO 2019244828       12/2019
WO    WO-2019244828 A1 *  12/2019
WO    WO 2020171145        8/2020
WO    WO-2020171145 A1 *   8/2020  ............. G01R 23/02

OTHER PUBLICATIONS

Ngamwongwattana et al., "Sync & Sense: VoIP Measurement Methodology for Assessing One-Way Delay Without Clock Synchronization," IEEE Transactions On Instrumentation and Measurement, May 2010, 59(5):1318-1326.

* cited by examiner

PERIODIC FLOW DETECTION DEVICE, DELAY ESTIMATION DEVICE, PERIODIC FLOW DETECTION METHOD AND PROGRAM

CROSS-REFERENCE TO RELATED APPLICATIONS

This application is a National Stage application under 35 U.S.C. § 371 of International Application No. PCT/JP2021/019406, having an International Filing Date of May 21, 2021. The disclosure of the prior application is considered part of the disclosure of this application, and is incorporated by reference in its entirety into this application.

TECHNICAL FIELD

The present invention relates to a periodic flow detection device, a delay estimation device, a periodic flow detection method, and a program.

BACKGROUND ART

Services and applications requiring low latency and low jitter, such as VR and AR, have appeared. In order to ensure low delay and low jitter, it is important to measure a delay of packets transmitted and received in a network. There is passive measurement as a method of measuring a one-side delay in a network, but there is a problem that it is necessary to prepare a clock synchronized with a plurality of measurement points.

In order to solve this problem, a method for estimating a delay with only a single clock has been proposed (for example, Non Patent Literature 1). FIG. 14 is a view illustrating related art of estimating a delay with only a single clock. FIG. 14 illustrates real-time transport protocol (RTP) packets ($P_1$ to $P_4$) transmitted from a transmission side to a reception side in voice over Internet protocol (VOIP). Here, the RTP packets are transmitted from the transmission side to the reception side at a constant time interval ($\Delta D$). $P_1$ is a packet received by the reception side with a queuing delay of zero. $P'_2$ to $P'_4$ are virtual packets in a case where $P_2$ to $P_4$ are received by the reception side with a queuing delay of zero similarly to $P_1$. A time interval $\Delta D_i$ (i=2 to 4) is a time interval between time at which a packet $P_i$ is received and time in a case where a virtual packet $P'_{i-1}$ is received.

In this event, a delay period of each packet $P_i$ can be calculated by calculating a difference between the time intervals $\Delta D_i$ and $\Delta D$.

CITATION LIST

Non Patent Literature

Non Patent Literature 1: B. Ngamwongwattana and R. Thompson, "Sync & Sense: VOIP Measurement Methodology for Assessing One-Way Delay Without Clock Synchronization, "IEEE TRANSACTIONS ON INSTRUMENTATION AND MEASUREMENT (2010)

SUMMARY OF INVENTION

Technical Problem

However, in the related art illustrated in FIG. 14, the reception side also needs to know the time interval $\Delta D$ at which the packets are transmitted from the transmission side. Thus, in a case where an application that uses other than VOIP is used, there is a case where transmission time interval $\Delta D$ is not known, and thus, it may be impossible to estimate a delay by using the related art.

An object of the present invention is to provide a periodic flow detection device capable of detecting, from a reception side, packets periodically transmitted from a transmission side in order to estimate a packet delay.

Solution to Problem

An aspect of the present invention is a periodic flow detection device including: a packet classification unit configured to classify packets into a plurality of flows on the basis of information included in acquired packets; a flow evaluation unit configured to evaluate a possibility that each of the plurality of flows is periodically transmitted on the basis of time at which the packets are acquired; and a flow detection unit configured to detect, from the plurality of flows, a periodic flow that is a flow to which packets periodically acquired belong on the basis of a result of the evaluation.

An aspect of the present invention is a delay estimation device including: a capture unit configured to acquire packets and record time at which the packets are acquired; a periodic flow detection unit configured to detect a periodic flow to which packets that are periodically transmitted belong on the basis of information included in the packets; and a delay estimation unit configured to estimate a delay of the packets on the basis of the packets belonging to the periodic flow.

An aspect of the present invention is a periodic flow detection method including: a packet classification step of classifying packets into a plurality of flows on the basis of information included in acquired packets; a flow evaluation step of evaluating a possibility that each of the plurality of flows is periodically transmitted on the basis of time at which the packets are acquired; and a flow detection step of detecting, from the plurality of flows, a periodic flow that is a flow to which packets periodically acquired belong on the basis of a result of the evaluation.

An aspect of the present invention is a computer program for causing a computer to function as the above-described periodic flow detection device.

Advantageous Effects of Invention

According to the present invention, in a case where a plurality of applications is used, it is possible to detect packets that are periodically transmitted.

DESCRIPTION OF EMBODIMENTS

Figure 1:
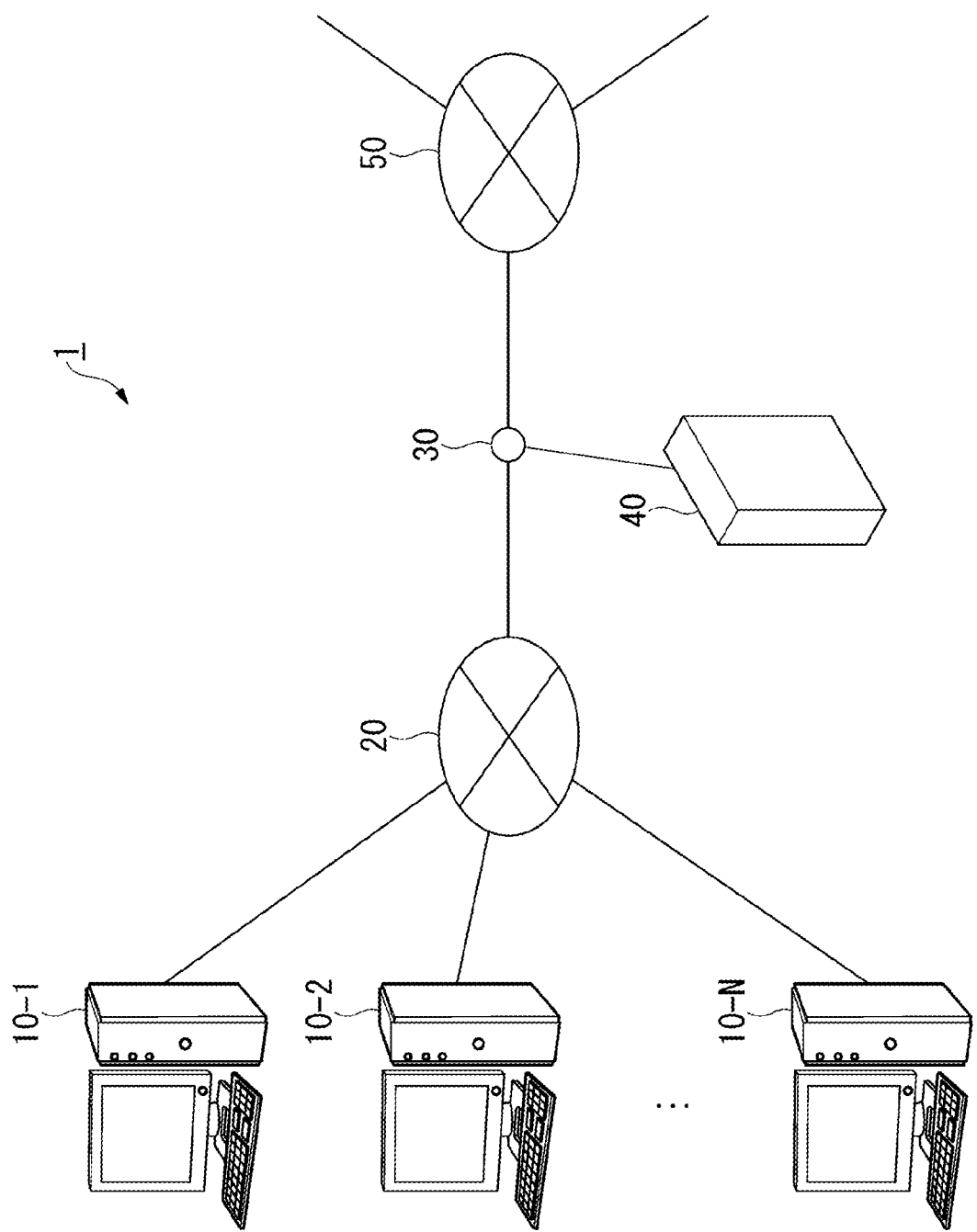
FIG. 1 is a view illustrating a configuration of a communication system according to an embodiment.

Embodiments of the present invention will be described in detail below with reference to the drawings.
Overall Configuration FIG. 1 is a view illustrating a configuration of a communication system 1.

The communication system 1 includes user equipment 10, a first network 20, a capture point 30, a delay estimation device 40, and a second network 50.

The user equipment 10 is connected to the first network 20. The user equipment 10 transmits packets to the first network 20. The user equipment 10 may be any equipment as long as it transmits packets. The user equipment 10 is, for example, a personal computer, an IoT sensor, a smartphone, or a server.

The first network 20 connects the user equipment 10 and the second network 50. The delay estimation device 40 acquires packets passing through the capture point 30 and estimates a delay of the packets on the basis of the acquired packets. The delay estimation device 40 acquires packets by causing network equipment such as a router provided at the capture point 30 to transfer the packets passing through the capture point 30. The second network 50 is connected to the first network 20. The second network 50 can be further connected to other networks and equipment.

The capture point 30 is a point indicating a position in the network where the delay estimation device 40 acquires packets. The capture point 30 is provided between the first network 20 and the second network 50 in the communication system 1 illustrated in FIG. 1. Here, the delay estimation device 40 acquires packets passing between the first network 20 and the second network 50, but is not limited thereto. For example, the delay estimation device 40 may obtain packets from equipment such as a server that receives packets from the user equipment 10.

Figure 2:
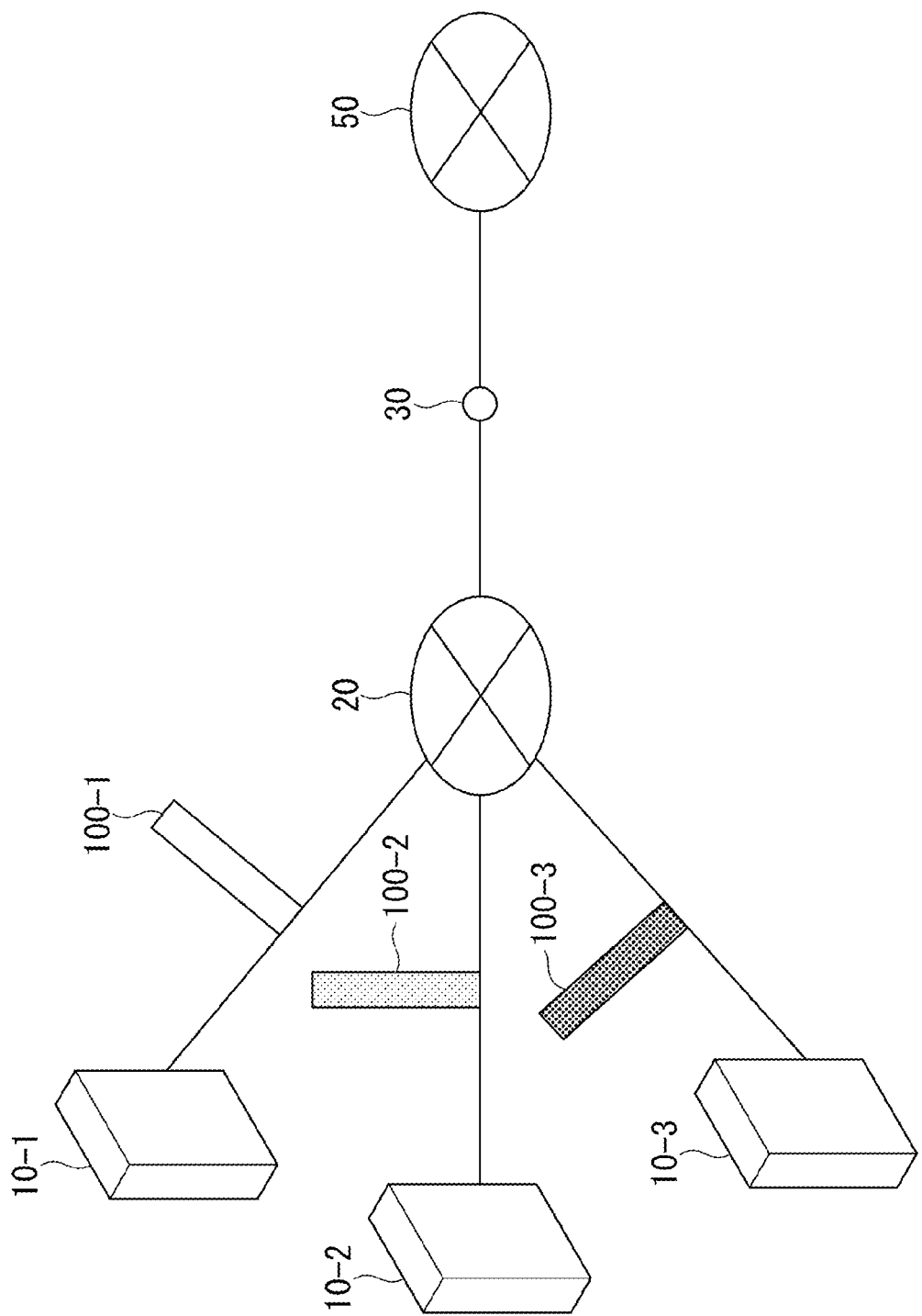
FIG. 2 is a schematic diagram illustrating packets to be transmitted in the communication system according to the embodiment.

FIG. 2 is a schematic diagram illustrating packets to be transmitted in the communication system 1.

User equipment 10-1 transmits a packet 100-1 to the first network 20. User equipment 10-2 transmits a packet 100-2 to the first network 20. User equipment 10-3 transmits a packet 100-3 to the first network 20. In the communication system 1 illustrated in FIG. 2, there are three pieces of user equipment 10, but the number is not limited thereto.

Figure 3:
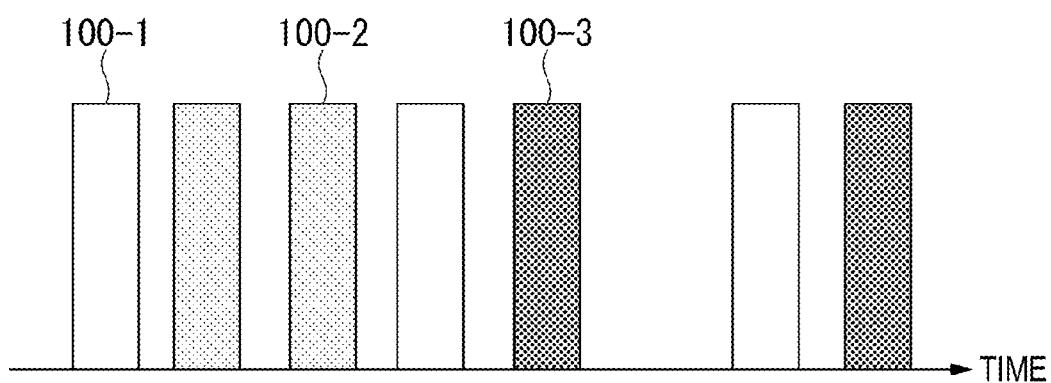
FIG. 3 is an example of packets passing through a capture point.

The packets 100 are transmitted from the first network 20 to the second network 50. The packets transmitted from the first network 20 to the second network 50 pass through the capture point 30. FIG. 3 is an example of the packets 100 passing through the capture point 30. As illustrated in FIG. 3, the packet 100-1, the packet 100-2, and the packet 100-3 for which transmission source user equipment 10 is different from each other pass through the capture point 30.

<Delay Estimation Device 40>

Figure 4:
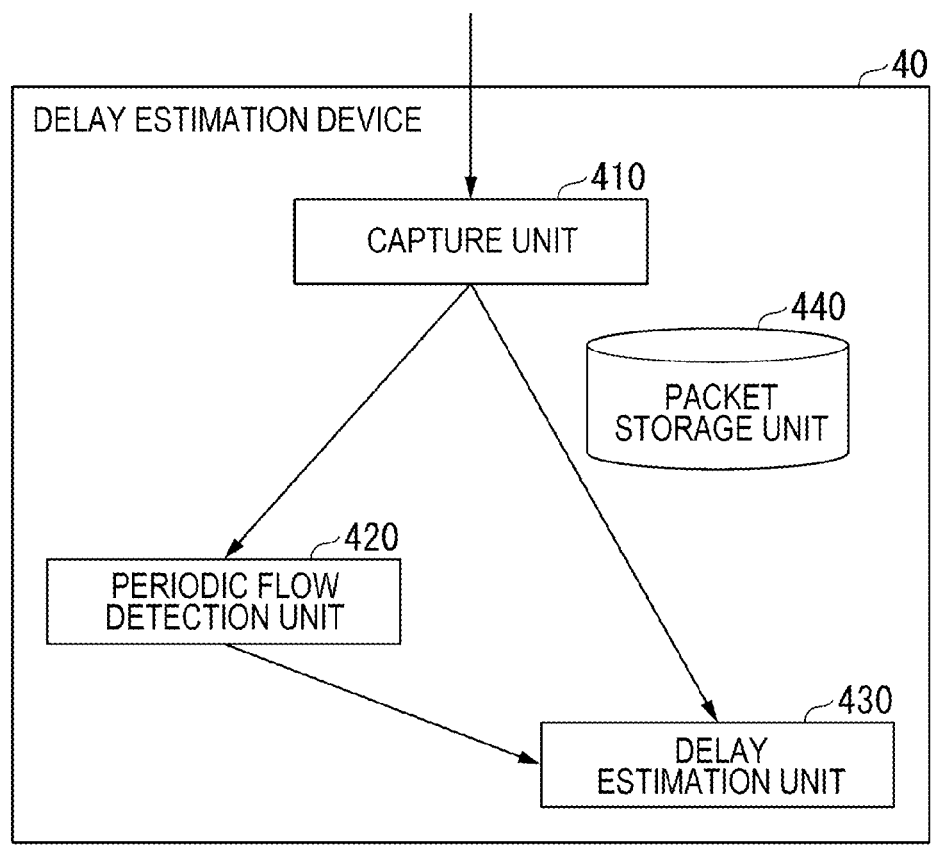
FIG. 4 is a view illustrating a configuration of a delay estimation device according to the embodiment.

FIG. 4 is a view illustrating a configuration of the delay estimation device 40.

The delay estimation device 40 includes a capture unit 410, a periodic flow detection unit 420, a delay estimation unit 430, and a packet acquisition time storage unit 440.

The capture unit 410 acquires packets passing through the capture point 30 within a certain period of time. Thereafter, the capture unit 410 associates time at which the packets are acquired with the packets and records the packets and the acquisition time in the packet acquisition time storage unit 440. The packet acquisition time storage unit 440 stores the packets acquired by the capture unit 410 within a certain period of time and the acquisition time. After a certain period of time has elapsed, the capture unit 410 transmits the packets and the acquisition time stored in the packet acquisition time storage unit 440 to the periodic flow detection unit 420 and the delay estimation unit 430.

The periodic flow detection unit 420 classifies the packets on the basis of information included in the packets received from the capture unit 410 and the acquisition time. Here, the packets are classified into a set called "flow". Here, the flow indicates a group of packets satisfying a predetermined condition. For example, the flow is a group of packets in which content of predetermined attribute information (part or all of the attribute information) included in the packets matches. For example, the flow is a group of packets in which information indicating transmission sources of the packets and transmission destinations of the packets included in the packets match. The periodic flow detection unit 420 detects a periodic flow to which packets to be periodically transmitted belong among the flows into which the packets are classified. A periodic flow detection method by the periodic flow detection unit 420 will be described later.

The delay estimation unit 430 estimates a delay of the packets belonging to the periodic flow on the basis of the packets received from the capture unit 410 and the reception time. In addition, when information regarding the periodic flow is received from the periodic flow detection unit 420, the delay estimation unit 430 changes the periodic flow and estimates the delay of the packets belonging to the changed periodic flow. Details of the delay estimation unit 430 will be described later.

<Flowchart of Delay Estimation Device>

Figure 5:
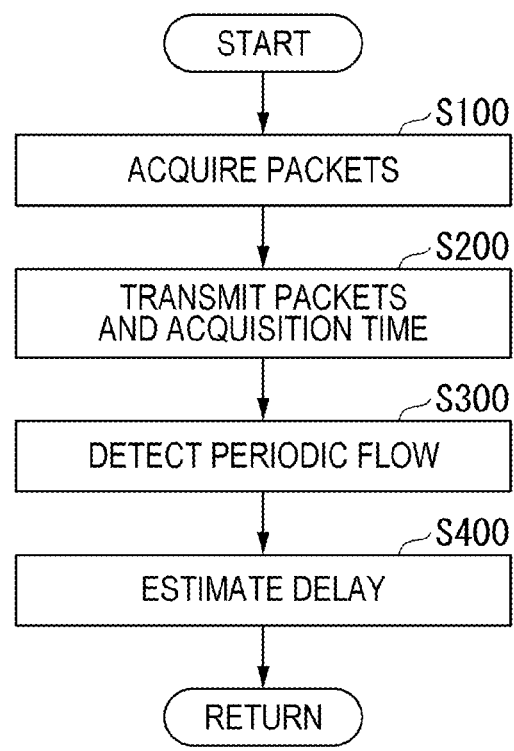
FIG. 5 is a flowchart illustrating operation of the delay estimation device according to the embodiment.

FIG. 5 is a flowchart illustrating operation of the delay estimation device 40. First, the capture unit 410 acquires packets passing through the capture point 30 within a certain period of time (step S100). Thereafter, the capture unit 410 transmits the information included in the acquired packets and the acquisition time of the packets to the periodic flow detection unit 420 and the delay estimation unit 430 (step S200). The periodic flow detection unit 420 detects the periodic flow on the basis of the received packets and the acquisition time (step S300). The delay estimation unit 430 estimates a delay of the periodic flow (step S400). The delay estimation device 40 estimates the delay of the periodic flow by repeating the operation from step S100 to step S400 at regular time intervals. A series of operation from step S100 to step S400 repeated by the delay estimation device 40 is referred to as a "cycle".

<Periodic Flow Detection Unit>

Figure 6:
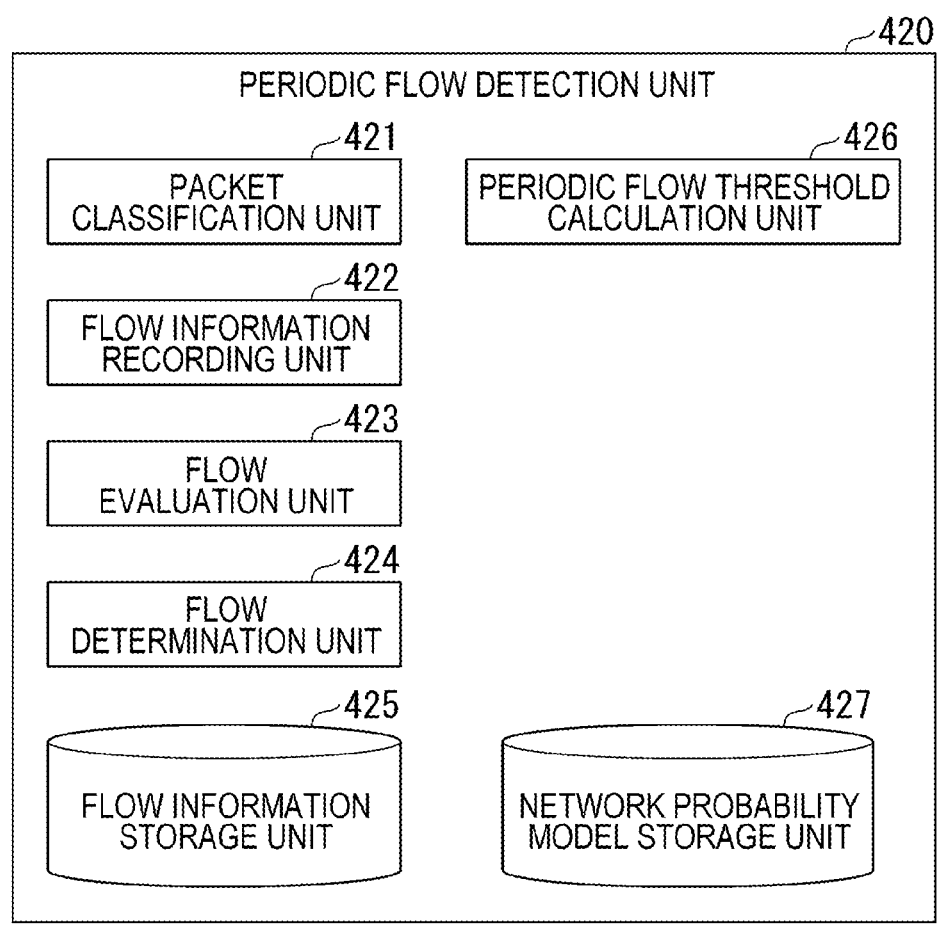
FIG. 6 is a view illustrating a configuration of a periodic flow detection unit according to the embodiment.

Here, details of functions of the periodic flow detection unit 420 will be described. FIG. 6 is a view illustrating a configuration of the periodic flow detection unit 420. The periodic flow detection unit 420 includes a packet classification unit 421, a flow information recording unit 422, a flow evaluation unit 423, a flow determination unit 424, a flow information storage unit 425, a periodic flow threshold calculation unit 426, and a network probability model storage unit 427.

The packet classification unit 421 classifies the packets for each flow to which the packets belong on the basis of the information included in the packets received from the capture unit 410 and the acquisition time. The packet classification unit 421 classifies the packets for each flow to which the packets belong, for example, on the basis of information regarding 5-tuple or VLAN included in the packets.

Figure 7:
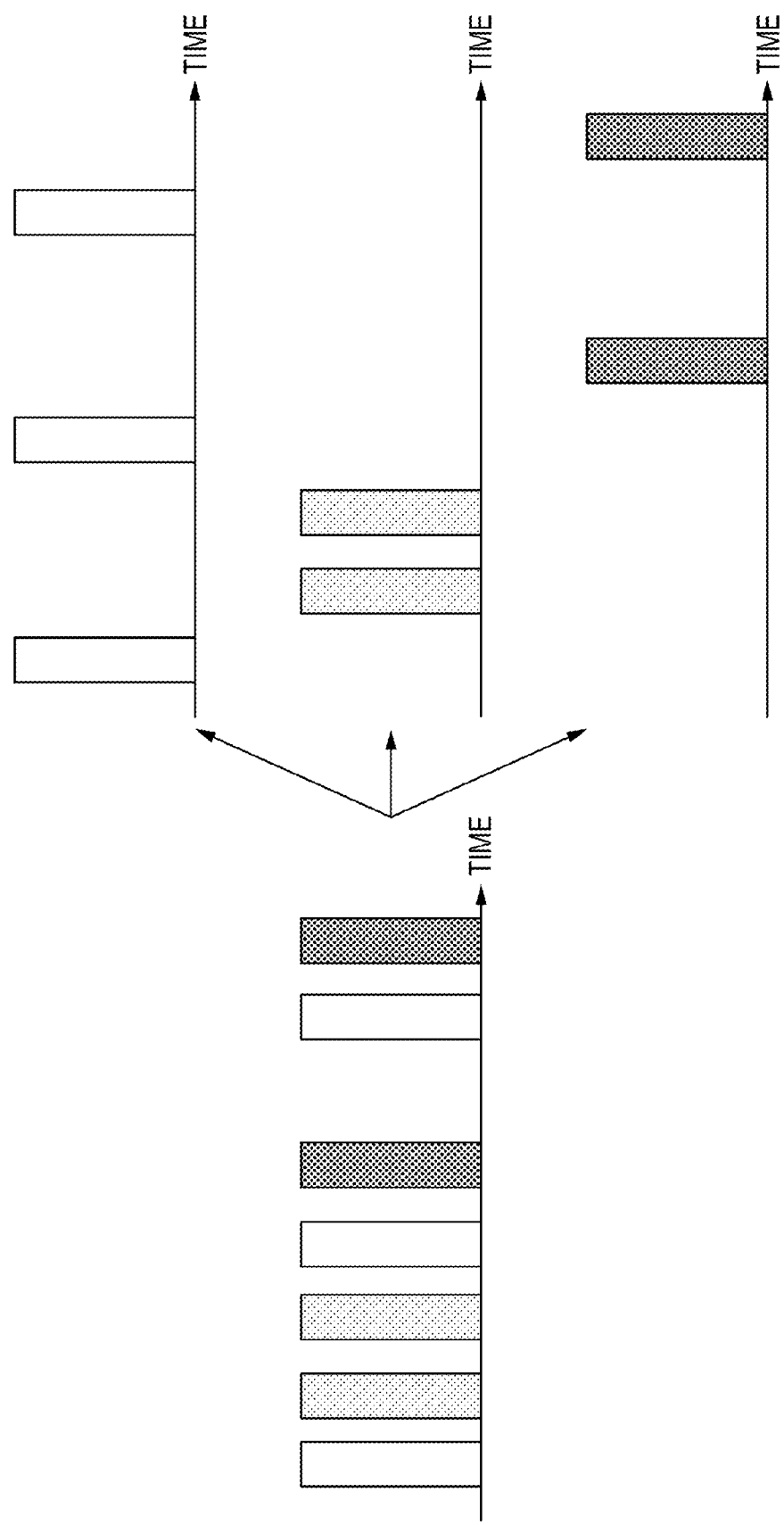
FIG. 7 is a view schematically illustrating classified packets according to the embodiment.

FIG. 7 is a view schematically illustrating the classified packets. The packets passing through the capture point 30 illustrated in FIG. 3 are classified into the flow to which each packet belongs by the packet classification unit 421, for example, in accordance with a difference in packet transmission source.

The flow information recording unit 422 records information regarding the flow classified by the packet classification unit 421 in the flow information storage unit 425. The information regarding the flow is, for example, information regarding 5-tuple or VLAN which is information to be used by the packet classification unit 421 to classify the packets. In the flow information storage unit 425, information regarding the flow into which the packets are classified is stored every time the periodic flow detection unit 420 receives the packets and the acquisition time from the capture unit 410. In other words, it is possible to know the flow to which the packets received every cycle by the periodic flow detection unit 420 belong by referring to the information stored in the flow information storage unit 425. The information regarding the flow stored in the flow information storage unit 425 is used for evaluation of the flow by the flow evaluation unit 423.

The flow evaluation unit 423 evaluates a possibility that each flow is periodically transmitted. The flow evaluated by the flow evaluation unit 423 is a flow to which the packets classified by the packet classification unit 421 belong. For example, the flow evaluation unit 423 calculates an evaluation value of the flow to which the packets acquired by the packet classification unit 421 belong. The larger the evaluation value, the higher the possibility that the packets belonging to the flow are periodically transmitted. The flow evaluated by the flow evaluation unit 423 is referred to as an evaluation flow. The flow evaluation unit 423 gives an evaluation value to each of all the flows to which the packets received in a current cycle belong by a method described below.

Figure 8:
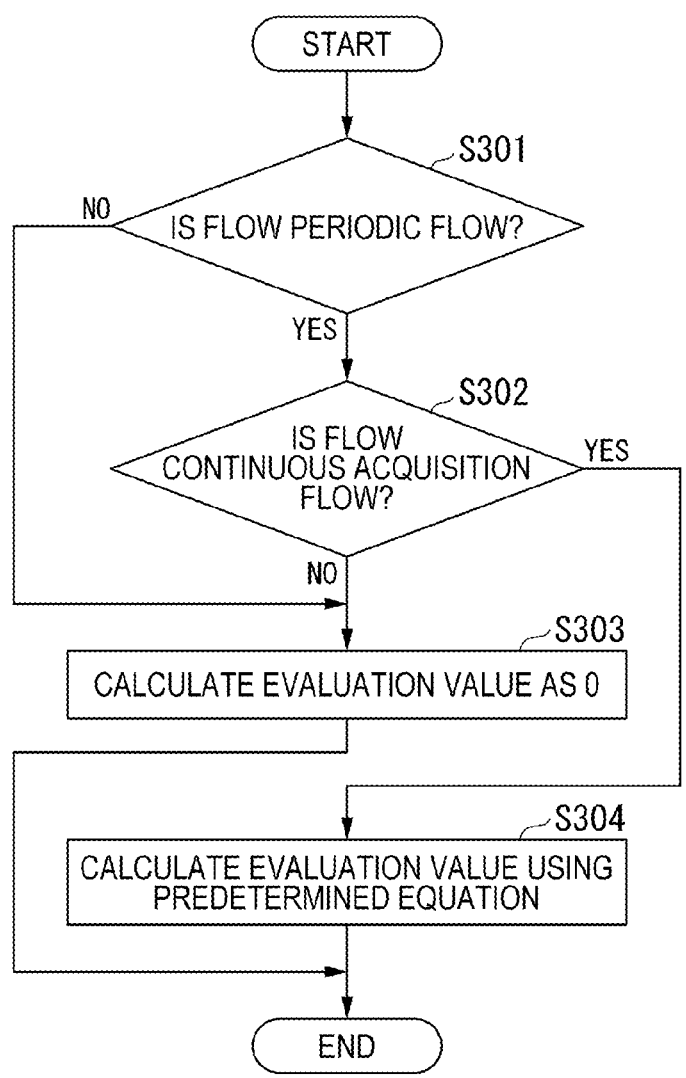
FIG. 8 is a flowchart illustrating a flow evaluation value calculation method by a flow evaluation unit according to the embodiment.

FIG. 8 is a flowchart illustrating a flow evaluation value calculation method by the flow evaluation unit 423. The flow evaluation unit 423 determines whether or not the evaluation flow is a periodic flow including packets acquired at a predetermined frequency or more (step S301).

<<Periodic Flow Determination Method>>

The flow evaluation unit 423 determines whether or not the evaluation flow is a periodic flow by the following method. The flow evaluation unit 423 creates frequency distribution of the acquisition time intervals of the packets included in the evaluation flow. Thereafter, the flow evaluation unit 423 compares the frequency (maximum frequency) of a mode value of the created frequency distribution with a predetermined threshold. A threshold calculation method will be described later. In a case where the frequency of the mode value exceeds the predetermined threshold, the flow evaluation unit 423 determines that the evaluation flow is a periodic flow.

Figure 9:
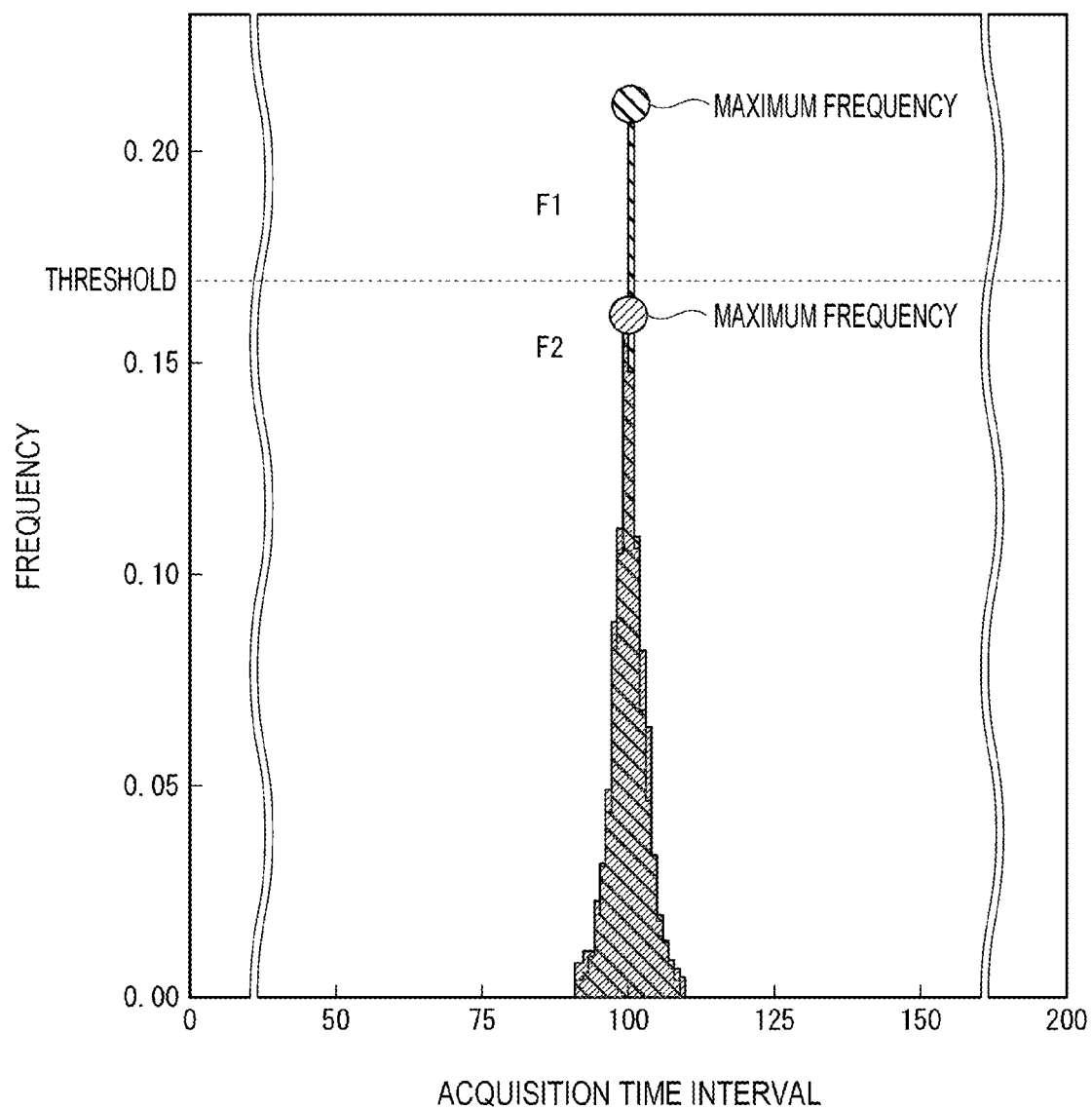
FIG. 9 is an example illustrating comparison between a maximum frequency of frequency distribution of acquisition time intervals and a threshold.

FIG. 9 is an example illustrating comparison between the maximum frequency of the frequency distribution of the acquisition time intervals and the threshold. The comparison between the maximum frequency of the frequency distribution of the acquisition time intervals and the threshold will be described using the frequency distribution of the acquisition time intervals illustrated in FIG. 9 which indicates the acquisition time intervals on a horizontal axis and indicates the frequency on a vertical axis. FIG. 9 illustrates frequency distribution according to two different evaluation flows (F1 and F2). In addition, a predetermined value of the frequency is set as the threshold. The maximum frequency of the evaluation flow F1 is higher than the threshold, and thus, it is determined that the corresponding evaluation flow is a periodic flow. The maximum frequency of the evaluation flow F2 is equal to or less than the threshold, and thus, it is determined that the corresponding evaluation flow is not a periodic flow.

The threshold serving as a reference of whether or not the evaluation flow is a periodic flow is calculated by the periodic flow threshold calculation unit 426 using a probability model stored in the network probability model storage unit 427 as follows. The probability model stored in the network probability model storage unit 427 is a probability model that describes a relationship between time intervals of packets transmitted from the user equipment 10 and time intervals of packets acquired by the capture unit 410. This probability model is, for example, a queue.

The periodic flow threshold calculation unit 426 calculates probability density functions P1 and P2 having the maximum frequency of the time intervals of the packets passing through the capture point 30 as a random variable. Specifically, in a case where it is assumed that packets are periodically transmitted from the user equipment 10, the periodic flow threshold calculation unit 426 calculates the probability density function P1 in which the maximum frequency of the frequency distribution created by the flow evaluation unit 423 is used as a random variable on the basis of the probability model stored in the network probability model storage unit 427. In addition, in a case where it is assumed that packets are periodically transmitted from the user equipment 10 including an allowable error, the periodic flow threshold calculation unit 426 calculates the probability density function P2 in which the maximum frequency created by the flow evaluation unit 423 is used as a random variable on the basis of the probability model stored in the network probability model storage unit 427.

Figure 10:
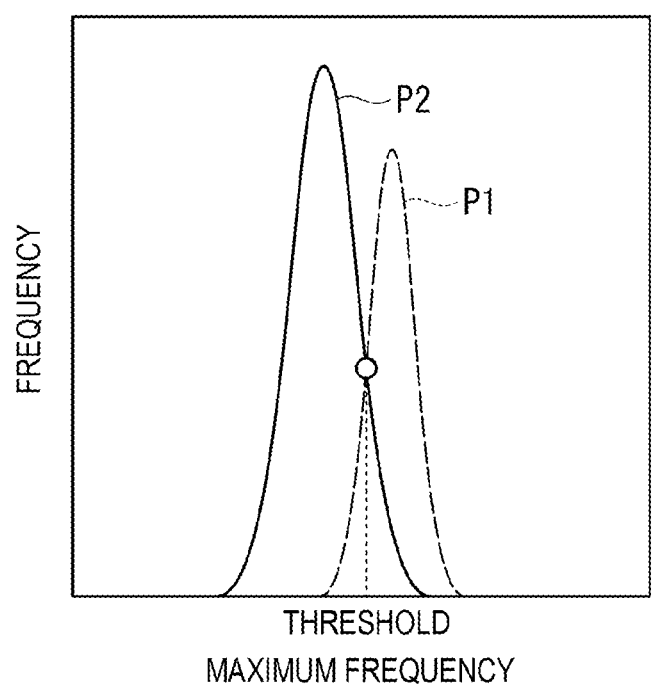
FIG. 10 is a view illustrating a threshold calculation method according to the embodiment.

Thereafter, the periodic flow threshold calculation unit 426 sets a random variable (maximum frequency) when the values of the functions P1 and P2 become equal as a threshold. FIG. 10 is a view illustrating a threshold calculation method. As illustrated in FIG. 10, in a case where the maximum frequency is indicated on the horizontal axis as the random variable, the frequency of the random variable is indicated on the vertical axis, and the functions P1 and P2 are plotted on the graph, the value of the random variable at the intersection of P1 and P2 becomes the threshold.

In a case where it is determined that the evaluation flow is not a periodic flow (step S301: No), the flow evaluation unit 423 determines that the packets belonging to the evaluation flow are not periodically transmitted and cannot be used for delay estimation, and thus, calculates the evaluation value of the evaluation flow as 0 (step S303). In a case where it is determined that the evaluation flow is a periodic flow (step S301: Yes), the flow evaluation unit 423 determines whether or not the evaluation flow is a continuous acquisition flow in which the capture unit 410 has acquired packets belonging to the evaluation flow from a predetermined period ago (step S302). For example, the flow evaluation unit 423 determines whether or not the evaluation flow is a continuous acquisition flow in which packets belonging to the evaluation flow are acquired in all cycles from a predetermined period ago.

A method of determining whether or not the evaluation flow is a continuous acquisition flow is based on the evaluation flow and flow information stored in the flow information storage unit 425. The flow information storage unit 425 stores a flow to which the packets acquired by the capture unit 410 in each cycle belong. In other words, the flow evaluation unit 423 can determine whether or not the evaluation flow is a flow to which the packets acquired by the capture unit 410 belong in each cycle by referring to the flow information storage unit 425. In other words, the flow evaluation unit 423 can determine whether or not the flow is stored every cycle before a predetermined cycle set in the flow information storage unit 425 in advance.

In a case where it is determined that the evaluation flow is not a continuous acquisition flow (step S302: No), the flow evaluation unit 423 determines that the packets belonging to the evaluation flow are not periodically transmitted, and thus, calculates the evaluation value of the evaluation flow as 0 (step S303). In a case where it is determined that the evaluation flow is a continuous acquisition flow (step S302: Yes), the flow evaluation unit 423 calculates an evaluation value v of the evaluation flow by, for example, Equation (1) (step S304).

[Math. 1]

$$v = \frac{1}{\sigma \times \Delta} \quad (1)$$

In Equation (1), σ is standard deviation of the acquisition time intervals of the packets included in the evaluation flow. Δ is an average value of the acquisition time intervals of the packets belonging to the evaluation flow. In other words, the smaller variation in the acquisition time intervals of the packets, and the smaller the average value of the acquisition time intervals, the larger the evaluation value v.

Figure 11:
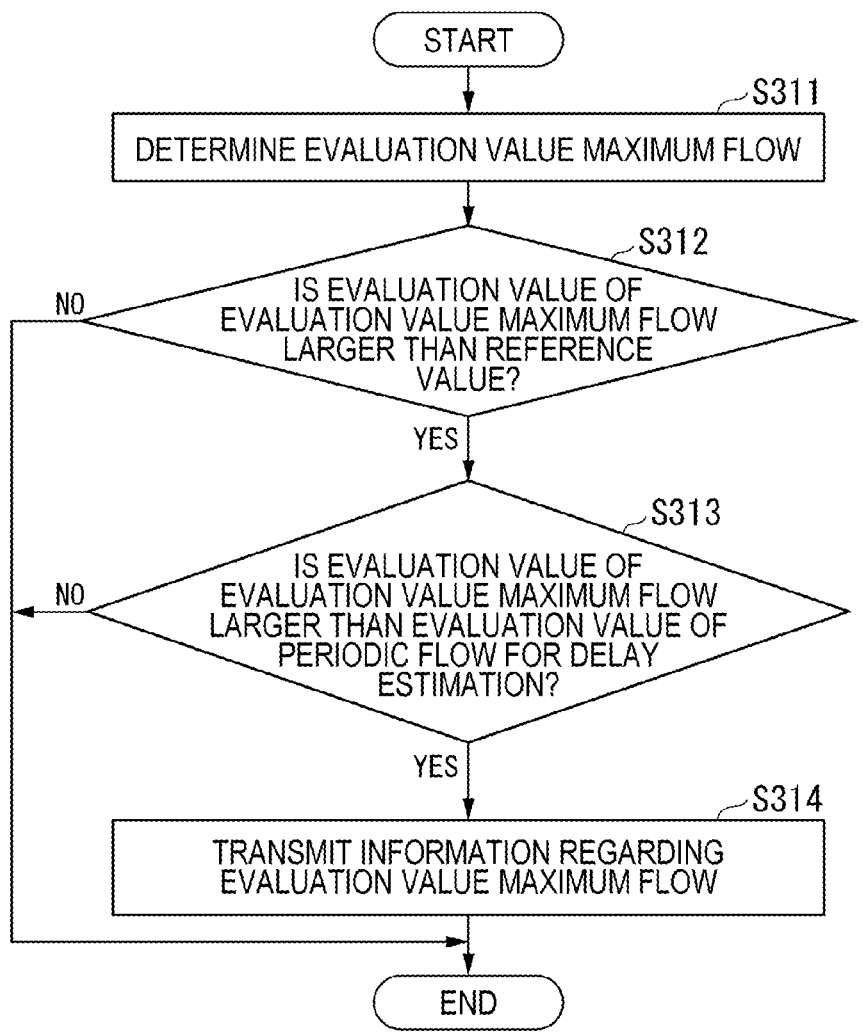
FIG. 11 is a flowchart illustrating a method for determining a periodic flow by the flow detection unit according to the embodiment.

The flow determination unit 424 determines a periodic flow for delay estimation to be used by the delay estimation unit 430 on the basis of the evaluation value of the flow calculated by the flow evaluation unit 423. FIG. 11 is a flowchart illustrating a method in which the flow determination unit 424 determines the periodic flow for delay estimation. First, the flow determination unit 424 determines a flow (hereinafter, the evaluation value maximum flow) having the maximum evaluation value from the evaluation value calculated for each flow by the flow evaluation unit 423 (step S311). Thereafter, the flow determination unit 424 determines whether or not the evaluation value of the evaluation value maximum flow is larger than a predetermined reference value (step S312). In a case where the evaluation value of the evaluation value maximum flow is smaller than the reference value (step S312: No), the flow determination unit 424 ends the operation. In other words, this means that the evaluation values of all the flows received in the current cycle do not reach the reference, and delay estimation is not performed in the current cycle.

In a case where the evaluation value of the evaluation value maximum flow is larger than the reference value (step S312: Yes), the flow determination unit 424 determines whether or not the evaluation value of the evaluation value maximum flow is larger than the evaluation value of the periodic flow for delay estimation (step S313). In a case where the maximum value of the evaluation value is equal to or less than the evaluation value of the periodic flow for delay estimation (step S313: No), the flow determination unit 424 ends the operation. A case where the maximum value of the evaluation value is equal to or less than the evaluation value of the periodic flow for delay estimation includes a case where the evaluation value maximum flow and the periodic flow for delay estimation are the same flow (that is, the maximum value of the evaluation value is equal to the evaluation value of the periodic flow for delay estimation). In a case where the maximum value of the evaluation value is larger than the evaluation value of the periodic flow for delay estimation (step S313: Yes), the flow determination unit 424 transmits information regarding the evaluation value maximum flow to the delay estimation unit 430 (step S314). In other words, the flow determination unit 424 determines that a new periodic flow for delay estimation is detected in step S314. Upon receiving the information regarding the maximum flow of the evaluation values from the flow determination unit 424, the delay estimation unit 430 changes the periodic flow for delay estimation to the received maximum flow of the evaluation values.

With the above configuration, the periodic flow detection unit 420 determines the periodic flow for delay estimation to be used by the delay estimation unit 430.

<Delay Estimation Unit>

The delay estimation unit 430 determines packets (hereinafter, periodic flow packets for delay estimation) belonging to the periodic flow for delay estimation and the acquisition time from the packets received from the capture unit 410 and the acquisition time and performs delay estimation. In addition, when the information regarding the evaluation value maximum flow is received from the periodic flow detection unit 420, the delay estimation unit 430 changes the periodic flow for delay estimation to the received evaluation value maximum flow.

<<Processing for Changing Periodic Flow for Delay Estimation>>

Figure 12:
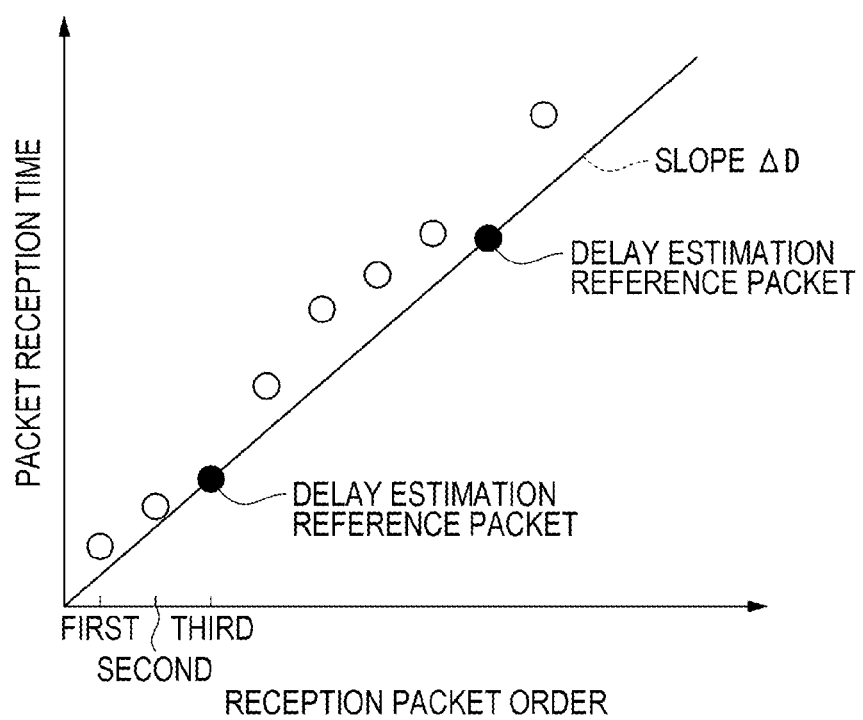
FIG. 12 is a view illustrating a method of specifying a delay 0 packet according to the embodiment.

In a case where the periodic flow for delay estimation is changed, the delay estimation unit 430 specifies a delay estimation reference packet serving as a reference for delay estimation and estimates a delay of the periodic flow packets for delay estimation on the basis of the packet transmission interval ΔD. The delay estimation reference packet is a packet estimated to have a small delay. FIG. 12 is a view illustrating a method for specifying a delay 0 packet. The delay estimation unit 430 calculates a transmission interval ΔD of the periodic flow packets for delay estimation as an average value of intervals of acquisition times of the received periodic flow packets for delay estimation. Thereafter, the delay estimation unit 430 plots the acquisition time of the periodic flow packets for delay estimation on the vertical axis and the acquisition order thereof on the horizontal axis. Thereafter, when a straight line connecting two points is drawn out of the plotted two points, the delay estimation unit 430 specifies two points at which a slope of the straight line becomes ΔD and an intercept of the straight line becomes the smallest. Thereafter, the delay estimation unit 430 specifies a periodic flow packet for delay estimation corresponding to the two points as a delay estimation reference packet. The delay estimation unit 430 estimates a delay of the periodic flow packets for delay estimation on the basis of the calculated ΔD and the specified delay estimation reference packet.

Figure 13:
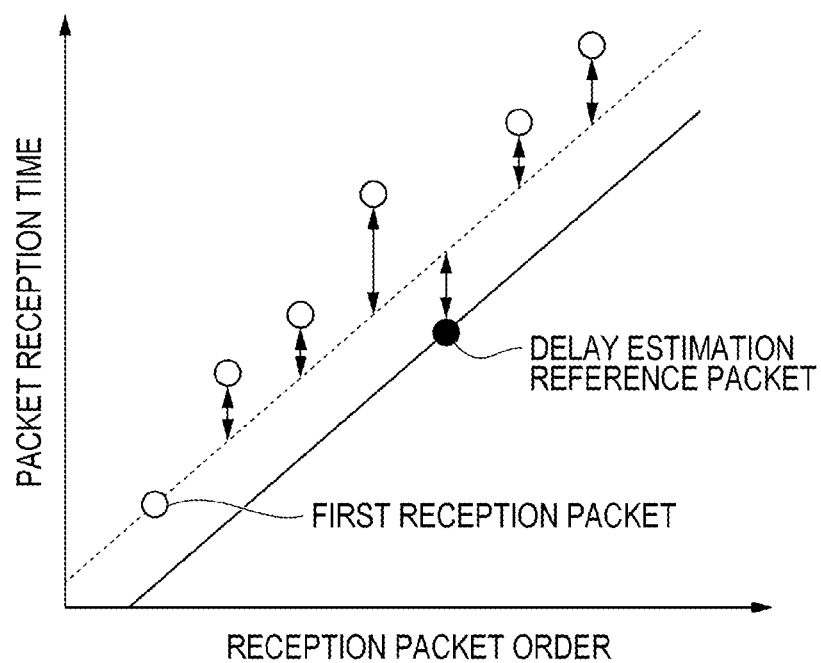
FIG. 13 is a view illustrating a method of specifying a delay 0 packet according to the embodiment.
Figure 14:
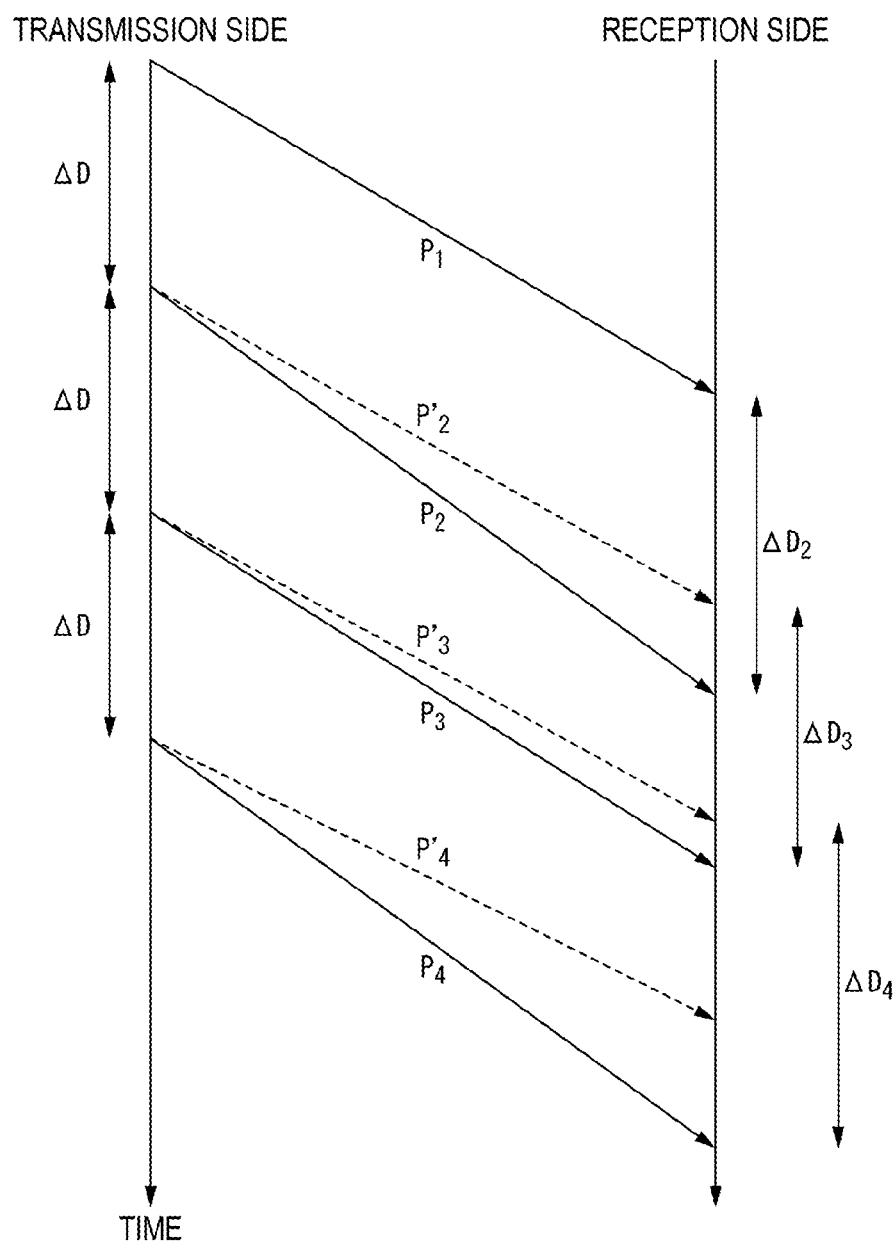
FIG. 14 is a view illustrating related art of estimating a delay with only a single clock.

The delay estimation unit 430 can also specify the delay estimation reference packet by another method described below. FIG. 13 is a view illustrating a method for specifying a delay estimation reference packet. Similarly to the method illustrated in FIG. 12, the delay estimation unit 430 calculates the transmission interval ΔD of the periodic flow packets for delay estimation as an average value of the intervals of the acquisition time of the received periodic flow packets for delay estimation and plots the acquisition time of the periodic flow packets for delay estimation on the vertical axis and the acquisition order on the horizontal axis. Thereafter, the delay estimation unit 430 subtracts a straight line (indicated by a dotted line) having a slope of ΔD from a point corresponding to the first acquired periodic flow packet for delay estimation and calculates a difference from the plotted point. In other words, when the acquisition time of the i-th acquired periodic flow packet for delay estimation is $T_i$, the difference $G_i$ is calculated by Equation (2).

[Math. 2]

$$G_i = |R_i - \{R_1 + \Delta D \times (i-1)\}| \quad (2)$$

Thereafter, the delay estimation unit 430 specifies the periodic flow packet for delay estimation having the smallest difference $G_i$ as the delay estimation reference packet. The delay estimation unit 430 estimates the delay of the periodic flow packet for delay estimation on the basis of ΔD and the delay estimation reference packet.

<<Processing in a Case where Periodic Flow for Delay Estimation is not Changed>>

In a case where the periodic flow for delay estimation is not changed, the delay estimation unit 430 estimates the delay of the periodic flow packets for delay estimation on the basis of ΔD calculated before that and the specified delay estimation reference packet. Even in a case where the periodic flow for delay estimation is not changed, the delay estimation unit 430 may change ΔD and the delay estimation reference packet on the basis of the received periodic flow packets for delay estimation and the acquisition time.

Other Embodiments

Although the embodiment has been described in detail with reference to the drawings, specific configurations are not limited to the above-described configurations, and various design changes, and the like, can be made thereto.

The delay estimation device 40 includes a central processing unit (CPU), a memory, an auxiliary storage device, and the like, connected by a bus and functions as a delay estimation device including a capture unit 410, a periodic flow detection unit 420, and a delay estimation unit 430 by executing a program. Note that all or some of the functions of the communication device may be implemented by using hardware such as an application specific integrated circuit (ASIC), a programmable logic device (PLD), or a field programmable gate array (FPGA). The program may be recorded on a computer-readable recording medium. The "computer-readable recording medium" refers to, for example, a portable medium such as a flexible disk, a magneto-optical disc, a ROM, or a CD-ROM, or a storage device such as a hard disk built in a computer system. The program may be transmitted via an electrical communication line.

REFERENCE SIGNS LIST

10 User equipment
20 First network
30 Capture Point
40 Delay estimation device
50 Second network
410 Capture unit
420 Periodic flow detection unit
430 Delay estimation unit
440 Packet acquisition time storage unit
421 Packet classification unit
422 Flow information recording unit
423 Flow evaluation unit
424 Flow determination unit
425 Flow information storage unit
426 Periodic flow threshold calculation unit
427 Network probability model storage unit

The invention claimed is:

1. A periodic flow detection device comprising:
a packet classification unit, including one or more processors, configured to classify packets into a plurality of flows on a basis of information included in acquired packets;
a flow evaluation unit, including one or more processors, configured to evaluate a possibility that each of the plurality of flows is periodically transmitted on a basis of time at which the packets are acquired and the flow evaluation unit is configured to evaluate each of the plurality of flows on a basis of whether or not a packet belonging to the flow is a periodic flow acquired at a predetermined frequency or more, and in a case where the flow is not the periodic flow, an evaluation value is calculated as zero; and
a flow determination unit, including one or more processors, configured to determine, from the plurality of flows, a periodic flow that is a flow to which packets periodically acquired belong on a basis of a result of the evaluation.

2. The periodic flow detection device according to claim 1, wherein the flow evaluation unit is configured to evaluate each of the plurality of flows on a basis of whether or not the packet belonging to the flow is a continuous acquisition flow acquired from a predetermined period ago, and
in a case where the flow is not the continuous acquisition flow, an evaluation value is calculated as zero.

3. The periodic flow detection device according to claim 1, wherein in a case where an evaluation value is not set at zero, the flow evaluation unit is configured to calculate the evaluation value using a predetermined equation.

4. A periodic flow detection method comprising:
classifying packets into a plurality of flows on a basis of information included in acquired packets;
evaluating a possibility that each of the plurality of flows is periodically transmitted on a basis of time at which the packets are acquired;
evaluating each of the plurality of flows on a basis of whether or not a packet belonging to the flow is a periodic flow acquired at a predetermined frequency or more, and in a case where the flow is not the periodic flow, an evaluation value is calculated as zero; and detecting, from the plurality of flows, a periodic flow that is a flow to which packets periodically acquired belong on a basis of a result of the evaluation.

5. The periodic flow detection method of claim 4, further comprising evaluating each of the plurality of flows on a basis of whether or not the packet belonging to the flow is a continuous acquisition flow acquired from a predetermined period ago, and in a case where the flow is not the continuous acquisition flow, an evaluation value is calculated as zero.

6. The periodic flow detection method of claim 4, wherein in a case where an evaluation value is not set at zero, calculating the evaluation value using a predetermined equation.

7. A non-transitory computer-readable medium storing software comprising instructions executable by one or more computers which, upon such execution, cause the one or more computers to perform operations comprising:
- classifying packets into a plurality of flows on a basis of information included in acquired packets;
- evaluating a possibility that each of the plurality of flows is periodically transmitted on a basis of time at which the packets are acquired;
- evaluating each of the plurality of flows on a basis of whether or not a packet belonging to the flow is a periodic flow acquired at a predetermined frequency or more, and in a case where the flow is not the periodic flow, an evaluation value is calculated as zero; and
- detecting, from the plurality of flows, a periodic flow that is a flow to which packets periodically acquired belong on a basis of a result of the evaluation.

8. The non-transitory computer-readable medium of claim 7, further comprising evaluating each of the plurality of flows on a basis of whether or not the packet belonging to the flow is a continuous acquisition flow acquired from a predetermined period ago, and in a case where the flow is not the continuous acquisition flow, an evaluation value is calculated as zero.

9. The non-transitory computer-readable medium of claim 7, wherein in a case where an evaluation value is not set at zero, calculating the evaluation value using a predetermined equation.

* * * * *